United States Patent
Kim et al.

(10) Patent No.: US 11,551,434 B2
(45) Date of Patent: Jan. 10, 2023

(54) APPARATUS AND METHOD FOR RETRAINING OBJECT DETECTION USING UNDETECTED IMAGE

(71) Applicant: ZIGBANG CO., LTD., Seoul (KR)

(72) Inventors: Jong Hang Kim, Seoul (KR); Sang Hak Lee, Seoul (KR); Bo Youn Kim, Seoul (KR)

(73) Assignee: ZIGBANG CO., LTD., Seoul (KR)

( * ) Notice: Subject to any disclaimer, the term of this patent is extended or adjusted under 35 U.S.C. 154(b) by 303 days.

(21) Appl. No.: 17/077,378

(22) Filed: Oct. 22, 2020

(65) Prior Publication Data
US 2021/0397868 A1 Dec. 23, 2021

(30) Foreign Application Priority Data

Jun. 17, 2020 (KR) .......... 10-2020-0073393

(51) Int. Cl.
| | |
|---|---|
| *G06K 9/00* | (2022.01) |
| *G06V 10/20* | (2022.01) |
| *G06T 5/50* | (2006.01) |
| *G06T 7/70* | (2017.01) |

(52) U.S. Cl.
CPC .............. *G06V 10/255* (2022.01); *G06T 5/50* (2013.01); *G06T 7/70* (2017.01); *G06T 2207/20081* (2013.01); *G06V 2201/07* (2022.01)

(58) Field of Classification Search
CPC ............ G06V 10/255; G06V 2201/07; G06V 10/776; G06T 5/50; G06T 7/70; G06T 2207/20081; G06T 11/00; G06T 7/20; G06T 19/006; G06N 20/00
See application file for complete search history.

(56) References Cited

U.S. PATENT DOCUMENTS

| | | | |
|---|---|---|---|
| 2021/0056362 A1* | 2/2021 | Nir | G06V 10/25 |
| 2021/0358164 A1* | 11/2021 | Liu | G06T 7/73 |

OTHER PUBLICATIONS

Zhong, Zhun, et al. "Camstyle: A novel data augmentation method for person re-identification." IEEE Transactions on Image Processing 28.3 (2018): 1176-1190. (Year: 2018).*

* cited by examiner

*Primary Examiner* — Andrew M Moyer
(74) *Attorney, Agent, or Firm* — The PL Law Group, PLLC

(57) ABSTRACT

An apparatus for retraining an object detector according to an exemplary embodiment includes an inputter configured to receive an undetected image, a style transferer configured to generate one or more first augmented images that have the same content attribute as an object area of the undetected image, but a different style attribute, a content transferer configured to generate one or more second augmented images that have the same style attribute as the object area, but a different content attribute, and an influence analyzer configured to analyze a cause of non-detection of the undetected image by comparing object detection reliabilities of the undetected image, the first augmented image, and the second augmented image.

20 Claims, 7 Drawing Sheets

(A)

(B)

(C)

(D)

APPARATUS AND METHOD FOR RETRAINING OBJECT DETECTION USING UNDETECTED IMAGE

CROSS-REFERENCE TO RELATED APPLICATION(S) AND CLAIM OF PRIORITY

This application claims the benefit under 35 USC § 119(a) of Korean Patent Application No. 10-2020-0073393, filed on Jun. 17, 2020, in the Korean Intellectual Property Office, the entire disclosure of which is incorporated herein by reference for all purposes.

BACKGROUND

1. Field

The following description relates to a machine learning-based object detection technique.

2. Description of Related Art

Object detection is a technique for identifying location information of a specific type of object within an image. Among several object detection techniques, machine learning-based object detectors have been widely used in recent years.

When an object is detected using a trained object detector, non-detection of an object may occur for various reasons. Conventionally, non-detection of an object has been responded to by retraining a detector using an image containing an undetected object, or by a developer manually analyzing the cause of non-detection from the image containing the undetected object. However, it is often difficult in reality to acquire enough images containing the undetected object to be able to retrain the detector. In addition, if the analysis of the cause of non-detection relies on the intuition of the developer, it is likely difficult to solve a problem of non-detection of an object, due to an incorrect analysis.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a means for ameliorating a problem of non-detection and improving the performance of an object detector by retraining the object detector using only a small number of images containing an undetected object. In one general aspect, there is provided an apparatus for retraining an object detector including an inputter configured to receive an undetected image, a style transferer configured to generate one or more first augmented images that have a same content attribute as an object area of the undetected image, but a different style attribute, a content transferer configured to generate one or more second augmented images that have a same style attribute as the object area, but a different content attribute, and an influence analyzer configured to analyze a cause of non-detection of the undetected image by comparing object detection reliabilities of the undetected image, the first augmented image, and the second augmented image.

The style transferer may extract the content attribute from the object area and generate the first augmented images by combining the extracted content attribute and a preset style-set.

The content transferer may extract the style attribute from the object area and generate the second augmented images by combining the extracted content attribute and a preset content-set.

The influence analyzer may compute a degree of influence of style and a degree of influence of content on the non-detection by using the object detection reliability of each of the undetected image, the first augmented images, and the second augmented images, and preset advance data.

The degree of influence of style may be computed by the following equation:

$$\text{Style}_{(1,2)} = \text{Max}(\text{Conf}_{A2} - \text{Conf}_{A1}, 0) + \text{Max}(\text{Conf}_{B2} - \text{Conf}_{B1}, 0),$$

where A1 represents an undetected object, B2 represents advance data, A2 represents a first augmented image in which a style attribute of A1 is transferred to correspond to B2, B1 represents a second augmented image in which a content attribute of A1 is transferred to correspond to B2, $\text{Conf}_{A1}$, $\text{Conf}_{A2}$, $\text{Conf}_{B1}$, and $\text{Conf}_{B2}$ represent an object detection reliability of A1, A2, B1, and B2, respectively, and $\text{Style}_{(1,2)}$ represents a degree of influence of style of A1.

The degree of influence of content may be computed by the following equation:

$$\text{Content}_{(A,B)} = \text{Max}(\text{Conf}_{B1} - \text{Conf}_{A1}, 0) + \text{Max}(\text{Conf}_{B2} - \text{Conf}_{A2}, 0),$$

where A1 represents an undetected object, B2 represents advance data, A2 represents a first augmented image in which a style attribute of A1 is transferred to correspond to B2, B1 represents a second augmented image in which a content attribute of A1 is transferred to correspond to B2, $\text{Conf}_{A1}$, $\text{Conf}_{A2}$, $\text{Conf}_{B1}$, and $\text{Conf}_{B2}$ represent an object detection reliability of A1, A2, B1, and B2, respectively, and $\text{Content}_{(A,B)}$ represents a degree of influence of content of A1.

The apparatus may further include a training data generator configured to generate one or more retraining images from the undetected image based on the degree of influence of style and the degree of influence of content.

The training data generator may change rates of change of style attribute and content attribute according to the degree of influence of style and the degree of influence of content when augmenting the retraining image.

The apparatus may further include a loss function updater configured to update a loss function of the object detector based on the degree of influence of style and the degree of influence of content.

The loss function updater may change a weight of a classification loss of the loss function according to the degree of influence of style and the degree of influence of content.

In another general aspect, there is provided a method of retraining an object detector, which is performed by a computing device that includes one or more processors and memory storing one or more programs to be executed by the one or more processors, the method including receiving an undetected image, generating one or more first augmented images that have a same content attribute as an object area of the undetected image, but a different style attribute, generating one or more second augmented images that have a same style attribute as the object area, but a different content attribute, and analyzing a cause of non-detection of the undetected image by comparing object detection reliabilities of the undetected image, the first augmented image, and the second augmented image.

The generating of the first augmented images may include extracting the content attribute from the object area and generating the first augmented images by combining the extracted content attribute and a preset style-set.

The generating of the second augmented images may include extracting the style attribute from the object area and generating the second augmented images by combining the extracted content attribute and a preset content-set.

The analyzing may include calculating a degree of influence of style and a degree of influence of content on the non-detection by using the object detection reliability of each of the undetected image, the first augmented images, and the second augmented images, and preset advance data.

The degree of influence of style may be computed by the following equation:

$$Style_{(1,2)} = Max(Conf_{A2} - Conf_{A1}, 0) + Max(Conf_{B2} - Conf_{B1}, 0),$$

where A1 represents an undetected object, B2 represents advance data, A2 represents a first augmented image in which a style attribute of A1 is transferred to correspond to B2, B1 represents a second augmented image in which a content attribute of A1 is transferred to correspond to B2, $Conf_{A1}$, $Conf_{A2}$, $Conf_{B1}$, and $Conf_{B2}$ represent an object detection reliability of A1, A2, B1, and B2, respectively, and $Style_{(1,2)}$ represents a degree of influence of style of A1.

The degree of influence of content may be computed by the following equation:

$$Content_{(A,B)} = Max(Conf_{B1} - Conf_{A1}, 0) + Max(Conf_{B2} - Conf_{A2}, 0),$$

where A1 represents an undetected object, B2 represents advance data, A2 represents a first augmented image in which a style attribute of A1 is transferred to correspond to B2, B1 represents a second augmented image in which a content attribute of A1 is transferred to correspond to B2, $Conf_{A1}$, $Conf_{A2}$, $Conf_{B1}$, and $Conf_{B2}$ represent an object detection reliability of A1, A2, B1, and B2, respectively, and $Content_{(A,B)}$ represents a degree of influence of content of A1.

The method may further include generating one or more retraining images from the undetected image based on the degree of influence of style and the degree of influence of content.

The generating of the retraining image may include changing rates of change of style attribute and content attribute according to the degree of influence of style and the degree of influence of content when augmenting the retraining image.

The method may further include updating a loss function of the object detector based on the degree of influence of style and the degree of influence of content.

The updating of the loss function may include changing a weight of a classification loss of the loss function according to the degree of influence of style and the degree of influence of content.

Other features and aspects will be apparent from the following detailed description, the drawings, and the claims.

Figure 1:
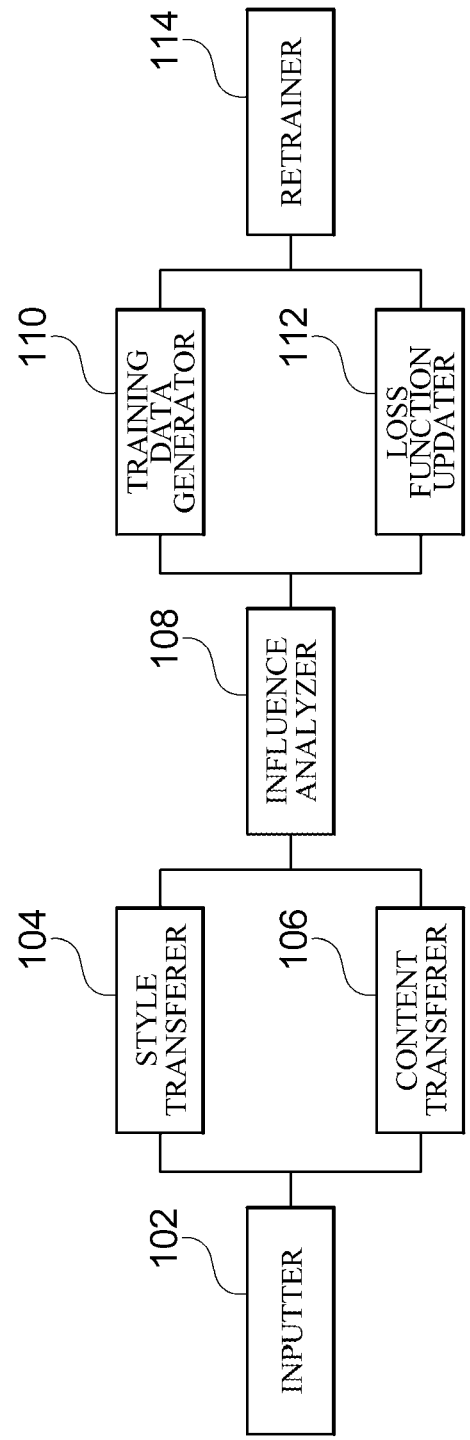
FIG. 1 is a block diagram illustrating an apparatus for retraining an object detector according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made based on the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram illustrating an apparatus 100 for retraining an object detector according to an exemplary embodiment. The apparatus 100 according to an exemplary embodiment refers to an apparatus for retraining an object detector using an image containing an object which the object detector fails to detect. In the following description, an "undetected object" refers to an object which an object detector fails to detect, and an "undetected image" refers to an image containing the undetected object. As shown in FIG. 1, the apparatus 100 for retraining an object detector may include an inputter 102, a style transferer 104, a content transferer 106, an influence analyzer 108, a training data generator 110, a loss function updater 112, and a retrainer 114.

The inputter 102 receives an undetected image in which an object is not detected from an object detector.

Figure 2:
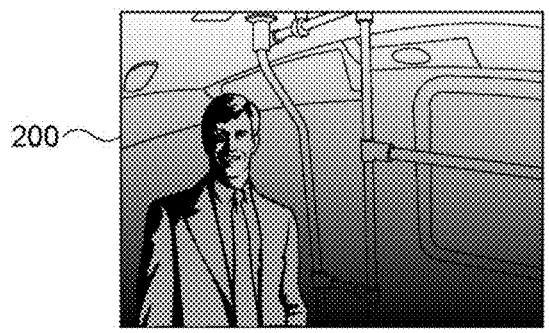
FIG. 2 is an exemplary diagram for describing a process of receiving an undetected image from an inputter according to an exemplary embodiment.
Figure 2:
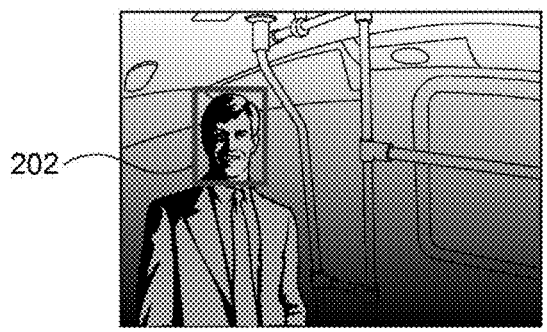
Figure 2:
Figure 2:
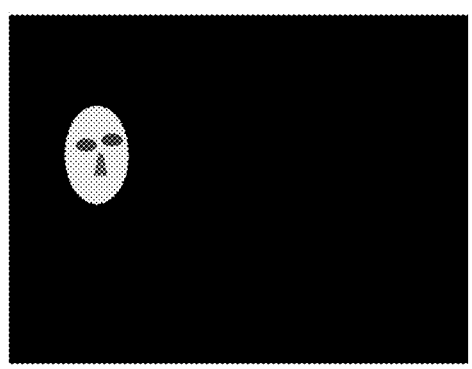

FIG. 2 is an exemplary diagram for describing a process of receiving the undetected image 200 from the inputter 102 in accordance with an exemplary embodiment. In order to relearn the undetected image, it is necessary to locate an object area to be detected within the undetected image. This is because, if the entire image is relearned without locating the object area, characteristics of a background irrelevant to the cause of the non-detection of the object can be learned together.

To this end, as shown in (B) of FIG. 2, the inputter 102 label an object area 202 in the form of a bounding box within the input undetected image 200. By doing so, the inputter 102 may distinguish an object from the other area within the image as shown in (C) of FIG. 2.

Meanwhile, as shown in (D) of FIG. 2, the inputter 102 may segment the object by region within the object area according to an exemplary embodiment. For example, if the object to be detected is a human face, the inputter 102 may segment a face area and specify detailed regions, such as eyes, nose, mouth, and the like. In the case of segmenting and specifying the object in this way, the quality of data may be improved when the training data generator 110, which will be described below, generates training data.

The style transferer 104 generates one or more first augmented images that have the same content attributes as the object area of the undetected image, but different style attributes.

In the disclosed embodiments, a content attribute refers to an attribute related to the appearance of an object. For example, in a case where the object is a human face, face images of the same person captured in various environments (indoor, outdoor, daytime, nighttime, and etc.) have the same content attributes. Also, a style attribute refers to an attribute related to color or texture, not the appearance of the object. For example, even images of the same person may have different style attributes according to changes in illuminance or noise, the type of camera (such as an RGB camera or an infrared (IR) camera), the presence or absence of backlight, and the like.

Figure 3:
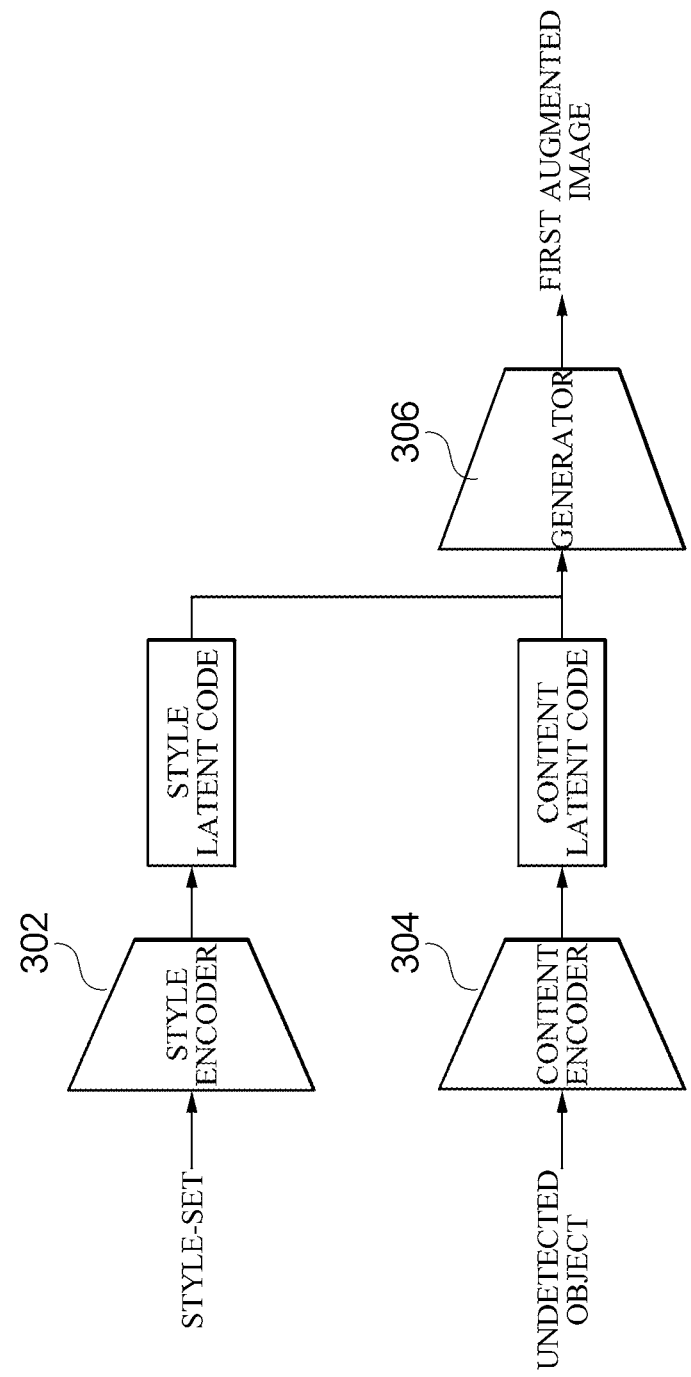
FIG. 3 is a block diagram for describing a detailed configuration of a style transferer according to an exemplary embodiment.

FIG. 3 is a block diagram for describing a detailed configuration of the style transferer 104 according to an exemplary embodiment. In one exemplary embodiment, the style transferer 104 may generate the first augmented image using generative adversarial networks (GANs). In detail, the style transferer 104 may be provided with a separate style-set and extract a style attribute (style latent code) in advance from the style-set by using a style encoder 302. In this case, the style-set may include a plurality of different styles. Then, the style transferer 104 generates one or more first augmented images by extracting the content attribute (content latent code) from the undetected object by using a content encoder 304, and then inputting a combination of the content attribute and the style attribute into a generator 306.

Next, the content transferer 106 generates one or more first augmented images having the same style attribute as the object area of the undetected image, but different content attribute.

Figure 4:
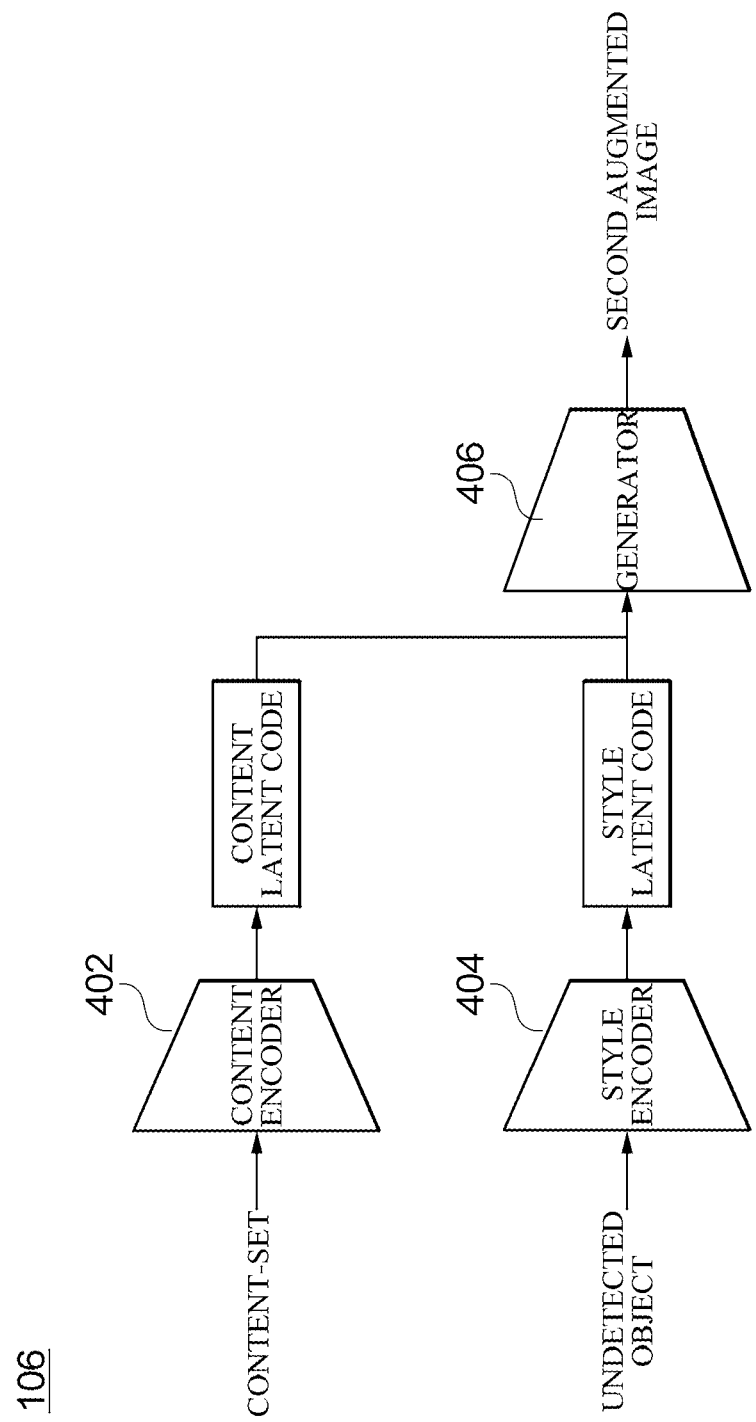
FIG. 4 is a block diagram illustrating a detailed configuration of a content transferer according to an exemplary embodiment.

FIG. 4 is a block diagram for describing a detailed configuration of the content transferer 106. In one exemplary embodiment, similarly to the style transferer 104, the content transferer 106 may generate the first augmented images using GANs. In detail, the content transferer 106 is provided with a separate content-set, and may extract a content attribute (content latent code) in advance by using a content encoder 402. In this case, the content-set may include a plurality of different contents. Then, the content transferer 106 generates one or more second augmented images by extracting the style attribute (style latent code) from the undetected image by using a style encoder 404, and then inputting a combination of the style attribute and the content attribute into a generator 406.

Then, the influence analyzer 108 analyzes the influence of each of the content and the style of the undetected object on the non-detection of the object. To this end, the influence analyzer 108 computes object detection reliability for each image by inputting the undetected image, the first augmented image, the second augmented image, and preset advance data, and computes a degree of influence of each of the style and the content on the cause of the non-detection of the undetected image by comparing the calculated reliabilities.

For example, when the object detection reliability of the first augmented image is higher than that of the undetected image, the influence analyzer 108 may determine that the style has an influence on the non-detection of the object. In this case, the degree of influence of the style may be computed based on a difference between the object detection reliability of the first augmented image and the object detection reliability of the undetected image. That is, as the difference between the object detection reliability of the first augmented image and the object detection reliability of the undetected image increases, a value of the degree of influence of the style also increases. Conversely, when the object detection reliability of the first augmented image is lower than that of the undetected image, the influence analyzer 108 may determine that the style has no influence on the non-detection of the object.

In addition, when the object detection reliability of the second augmented image is higher than that of the undetected image, the influence analyzer 108 may determine that the content has an influence on the non-detection of the object. In this case, the degree of influence of the content may be calculated based on the object detection reliability of the second augmented image and the object detection reliability of the undetected image. That is, as the difference between the object detection reliability of the second augmented image and the object detection reliability of the undetected image increases, a value of the degree of influence of the content also increases. Conversely, when the object detection reliability of the second augmented image is lower than that of the undetected image, the influence analyzer 108 may determine that the content has no influence on the non-detection of the object.

Meanwhile, when the object detection reliability of the first augmented image is higher than that of the second augmented image, the influence analyzer 108 may determine that the influence of the style on the cause of the non-detection is greater than that of the content. Conversely, when the object detection reliability of the first augmented image is lower than that of the second augmented image, the influence analyzer 108 may determine that the influence of the content on the cause of the non-detection is greater than that of the style.

In one exemplary embodiment, the degree of influence of style and the degree of influence of content may be computed using the undetected object and the advance data. Here, the advance data is an object that has been determined to be detectable in advance by the object detector and is used for comparison with the undetected object.

Figure 5:
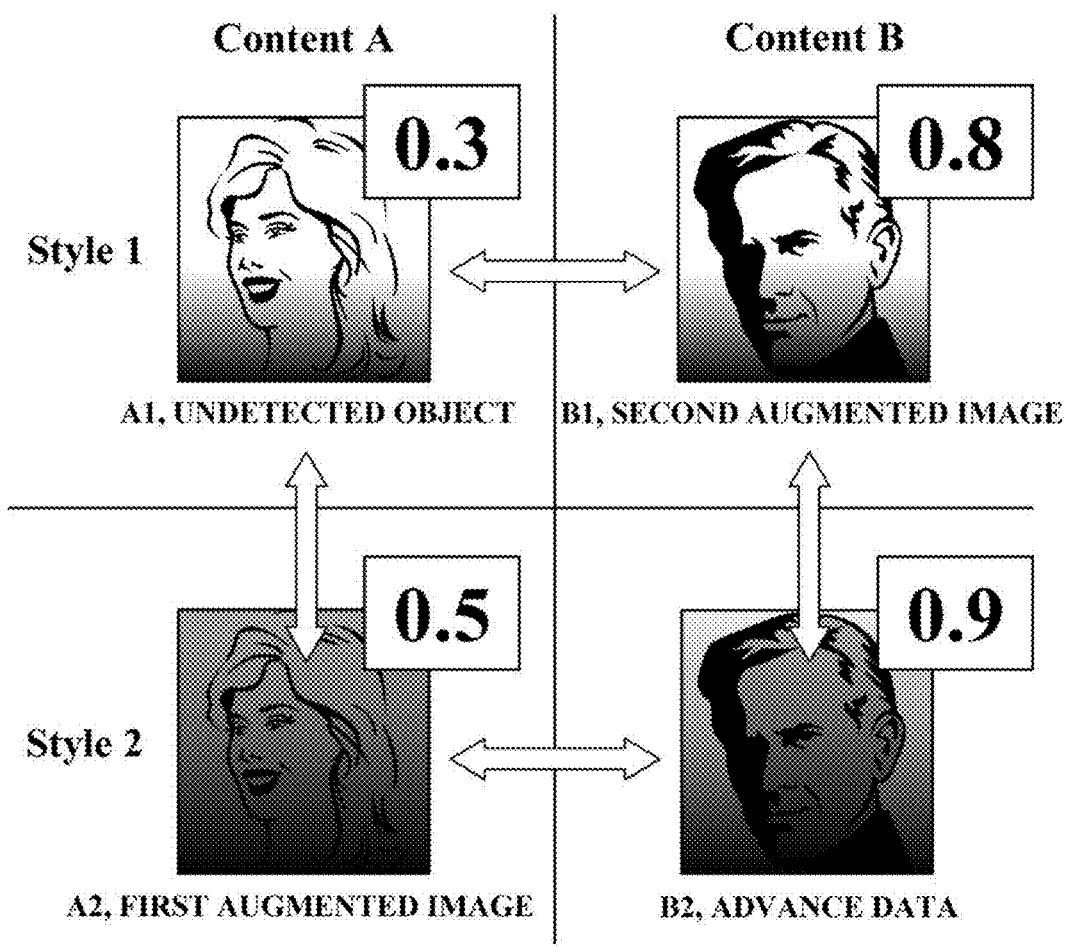
FIG. 5 is an exemplary diagram for describing a process of calculating a degree of influence of style and a degree of influence of content by an influence analyzer according to an exemplary embodiment.

FIG. 5 is an exemplary diagram for describing a process of calculating a degree of influence of style and a degree of influence of content by the influence analyzer 108. In the illustrated diagram, A1 represents an undetected object, which has content attribute "A" and style contribute "1." B2 represents advance data, which has content attribute "B" and style attribute "2." A2 represents a first augmented image in which the style attribute of A1 is transferred from 1 to 2, and B1 represents a second augmented image in which the content attribute of A1 is transferred from A to B.

In such a situation, the degree of influence of style ($Style_{(1, 2)}$) and the degree of influence of content ($Content_{(A, B)}$) of the undetected object may be calculated as shown in Equations 1 and 2 below.

$$Style_{(1,2)}=Max(Conf_{A2}-Conf_{A1}, 0)+Max(Conf_{B2}-Conf_{B1}, 0) \quad \text{[Equation 1]}$$

$$Content_{(A,B)}=Max(Conf_{B1}-Conf_{A1}, 0)+Max(Conf_{B2}-Conf_{A2}, 0) \quad \text{[Equation 2]}$$

At this time, $Conf_{A1}$, $Conf_{A2}$, $Conf_{B1}$, and $Conf_{B2}$ represent the object detection reliability of A1, A2, B1, and B2, respectively.

If the object detection reliability of each of A1, A2, B1, and B2 is calculated as 0.3, 0.5, 0.8, and 0.9, the degree of influence of style and the degree of influence of content are as follows.

$$Style_{(1,2)}=(0.5-0.3)+(0.9-0.8)=0.3$$

$$Content_{(A,B)}=(0.8-0.3)+(0.9-0.5)=0.9$$

That is, in this case, the influence of the content is greater than that of the style as the cause of the non-detection of the object.

Then, the training data generator 110 generates one or more retraining images from the undetected image based on the degrees of influence of style and content computed by the influence analyzer 108. Specifically, the training data generator 110 may generate the one or more retraining images by augmenting the undetected object while changing one or more of the style attribute and the content attribute of the undetected object in the undetected image using the GANs.

In one exemplary embodiment, the training data generator 110 may adjust the rates of change of the style attribute and the content attribute according to the computed degrees of influence of style and content when augmenting the retraining image. For example, when the degree of influence of style is greater than the degree of influence of content, the training data generator 110 may generate training data such that the style attribute is maintained as much as possible. For instance, when the influence of backlight style is greater, the training data generator 110 may generate the training data by adjusting the backlight intensity to various levels, while basically maintaining the backlight style, as the influence is greater. Conversely, when the degree of influence of content is greater than the degree of influence of style, the training data generator 110 may generate the training data such that the content attribute is maintained as much as possible. For example, when the influence of face content of a specific person is greater than the influence of style, the training data generator 110 may generate the training data in such a manner that, as the influence is greater, face data of various angles of the face is generated while the corresponding face is basically maintained.

Next, the loss function updater 112 updates a loss function of the object detector based on the degree of influence of style and the degree of influence of content.

The loss function (loss) of the object detector generally has a structure as shown in Equation 3 below.

$$loss=L_{conf}+L_{loc} \quad \text{[Equation 3]}$$

Herein, $L_{conf}$ represents classification loss, and $L_{loc}$ represents localization loss.

In one exemplary embodiment, the loss function updater 112 may change a weight of the classification loss of the loss function according to the degree of influence of style and the degree of influence of content, which can be expressed as the following equation. Herein, $\omega_i$ is a classification loss weight for the $i^{th}$ object, $\alpha$ is a content weight, and $\beta$ is a style weight.

$$loss = \omega_i L_{conf} + L_{loc} \quad \text{[Equation 4]}$$

$$\omega_i \begin{cases} \alpha, \text{ when a degree of influence of content is} \\ \quad \text{greater than or equal to a reference value} \\ \beta, \text{ when a degree of influence of style is greater} \\ \quad \text{than or equal to a reference value} \\ 1, \text{ when a degree of influence is lower than} \\ \quad \text{or equal to a reference value} \end{cases}$$

In the above equation, when the degree of influence of content is greater than the degree of influence of style and its value is greater than or equal to the reference value, the content weight is applied, and when the degree of influence of style is greater than the degree of influence of content and its value is greater than or equal to the reference value, the style weight is applied. The content weight and the style weight may be calculated as follows, respectively.

$$\alpha=content_{(A,B)}*W+B \quad \text{[Equation 5]}$$

$$\beta=style_{(A,B)}*W+B \quad \text{[Equation 6]}$$

FIG. 5 illustrates an example in which the degree of influence of content is greater than the degree of influence of style. Assuming that W=2 and B=1, the content weight of the loss function above is as follows.

$$\alpha=0.9*2+1=2.8$$

Finally, the retrainer 114 performs retraining of the object detector using the training data generated by the training data generator 110 and the loss function updated by the loss function updater 112, thereby enabling the object detector to effectively cope with the undetected image.

Figure 6:
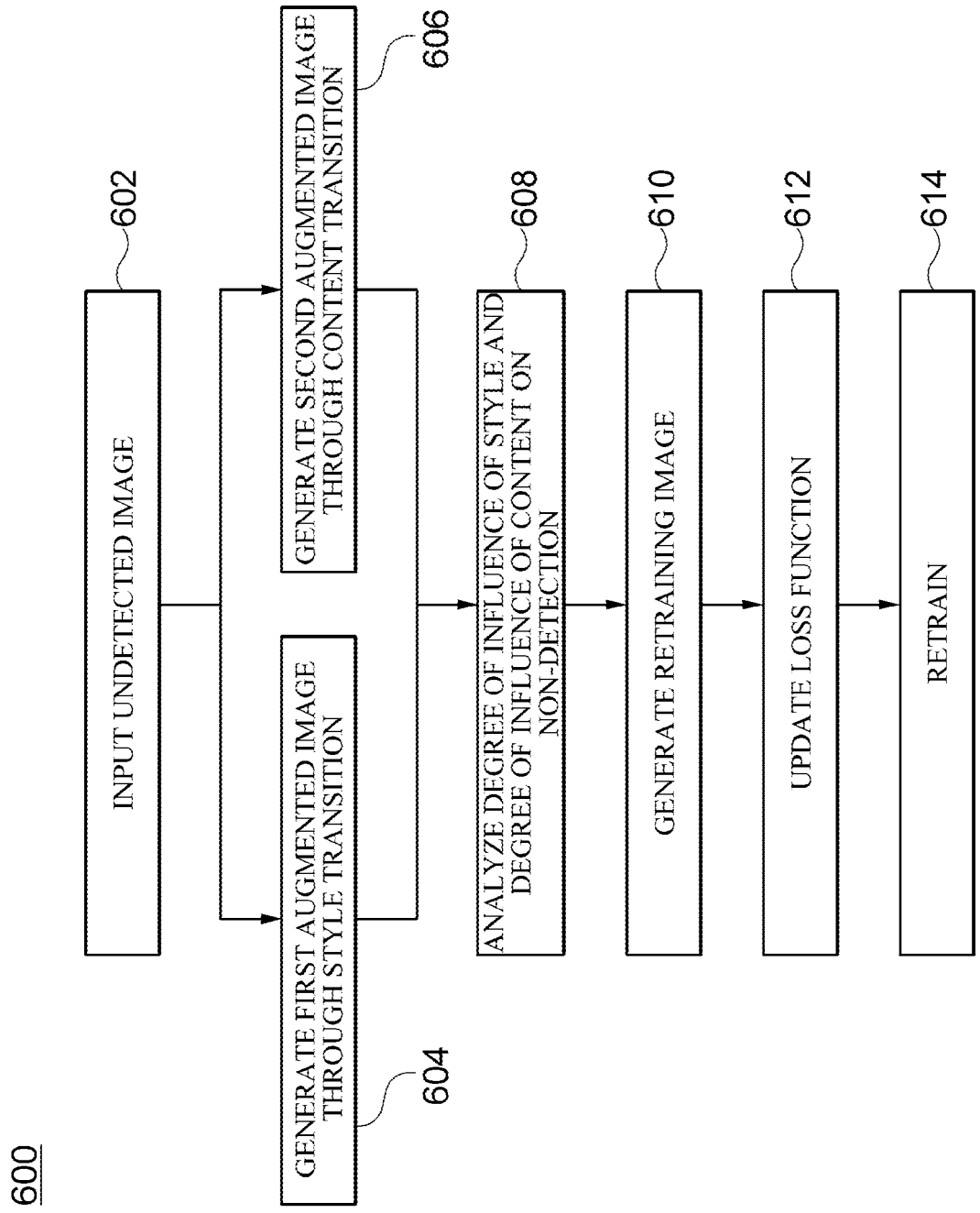
FIG. 6 is a flowchart illustrating a method of retraining an object detector according to an exemplary embodiment.

FIG. 6 is a flowchart for describing a method of retraining an object detector according to an exemplary embodiment. The illustrated flowchart may be performed by a computing device that includes one or more processors and memory storing one or more programs to be executed by the one or more processors, for example, the apparatus 100 for retraining an object detector. In the illustrated flowchart, at least some of the operations may be performed in different order or may be combined into fewer operations or further divided into more operations. In addition, some of the operations may be omitted, or one or more extra operations, which are not illustrated, may be added to the flowchart and be performed.

In operation 602, the inputter 102 of the apparatus 100 for retraining an object detector receives an image determined to be undetected by the object detector.

In operation 604, the style transferer 104 generates one or more first augmented images having the same content attributes as that of an object area of the undetected image, but different style attributes.

In operation 606, the content transferer 106 generates one or more second augmented images having the same style attributes as the object area, but different content attributes.

In operation 608, the influence analyzer 108 analyzes the cause of the non-detection of the undetected image by comparing object detection reliabilities of the undetected image, the first augmented image, and the second augmented image. As described above, the influence analyzer 108 is configured to compute degrees of influence of style and content on the non-detection using the object detection reliabilities of the undetected image, the first augmented image, and the second augmented image.

In operation 610, the training data generator 110 generates one or more retraining images from the undetected image based on the degrees of influence of style and content computed in operation 608. In this case, the training data generator 110 may change a rate of change of the style attribute and the content attribute according to the degree of influence of style and the degree of influence of content.

In operation 612, the loss function updater 112 updates a loss function of the object detector based on the degree of influence of style and the degree of influence of content. In one exemplary embodiment, the loss function updater 112 may change the weight of the classification loss of the loss function according to the degree of influence of style and the degree of influence of content.

In operation 614, the retrainer 114 performs retraining of the object detector using the training data generated by the training data generator 110 and the loss function updated by the loss function updater 112.

Figure 7:
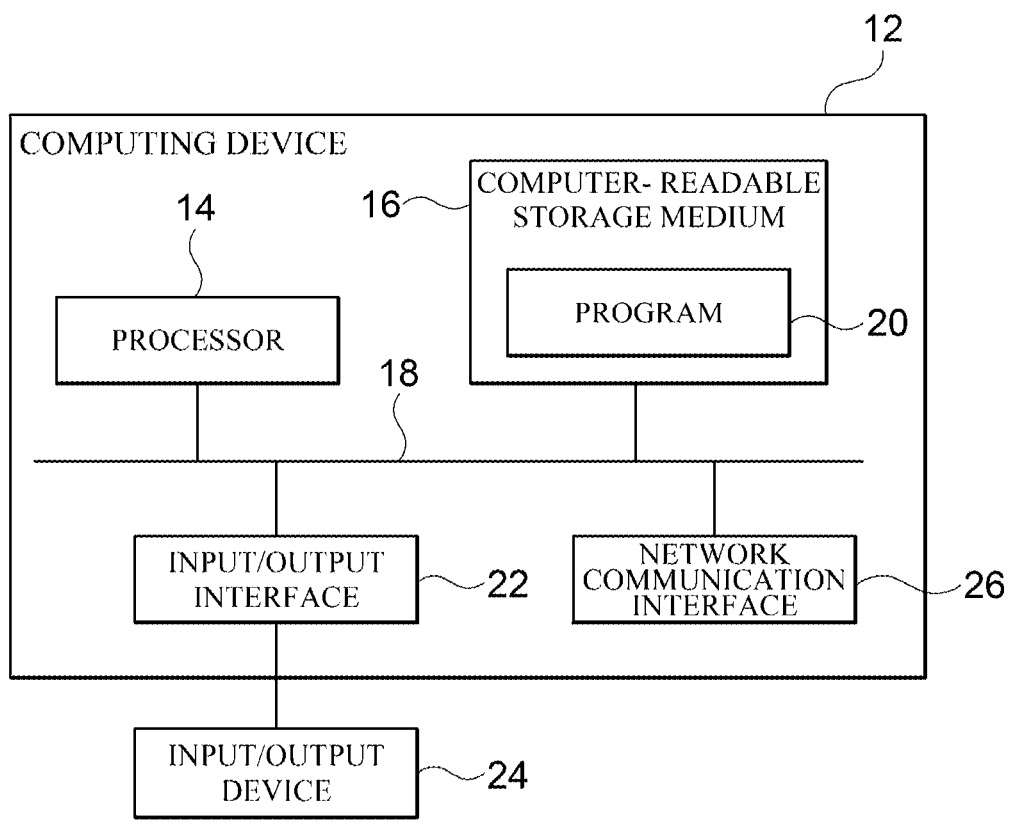
FIG. 7 is a block diagram illustrating an example of a computing environment including a computing device suitable for use in exemplary embodiments.

FIG. 7 is a block diagram illustrating an example of a computing environment including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In one exemplary embodiment, the computing device 12 may be the apparatus 100 for retraining an object detector according to the disclosed exemplary embodiments. The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed exemplary embodiments, the cause of the non-detection of an object may be quantitatively without relying on the intuition of a developer. Also, data necessary for retraining is augmented using only a small number of undetected images, so that a problem of non-detection can be ameliorated and the performance of an object detector can be improved while reducing the time required for collecting retraining images and labeling.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for retraining an object detector comprising:
    an inputter configured to receive an undetected image;
    a style transferer configured to generate one or more first augmented images that have a same content attribute as an object area of the undetected image, but a different style attribute;
    a content transferer configured to generate one or more second augmented images that have a same style attribute as the object area, but a different content attribute; and
    an influence analyzer configured to analyze a cause of non-detection of the undetected image by comparing object detection reliabilities of the undetected image, the first augmented image, and the second augmented image.

2. The apparatus of claim 1, wherein the style transferer is configured to extract the content attribute from the object area and generate the first augmented images by combining the extracted content attribute and a preset style-set.

3. The apparatus of claim 1, wherein the content transferer is configured to extract the style attribute from the object area and generate the second augmented images by combining the extracted content attribute and a preset content-set.

4. The apparatus of claim 1, wherein the influence analyzer is configured to compute a degree of influence of style and a degree of influence of content on the non-detection by using the object detection reliability of each of the undetected image, the first augmented images, and the second augmented images, and preset advance data.

5. The apparatus of claim 4, wherein the degree of influence of style is computed by the following equation:

$$Style_{(1,2)}=Max(Conf_{A2}-Conf_{A1}, 0)+Max(Conf_{B2}-Conf_{B1}, 0),$$

where A1 represents an undetected object, B2 represents advance data, A2 represents a first augmented image in which a style attribute of A1 is transferred to correspond to B2, B1 represents a second augmented image in which a content attribute of A1 is transferred to correspond to B2, $Conf_{A1}$, $Conf_{A2}$, $Conf_{B1}$, and $Conf_{B2}$ represent an object detection reliability of A1, A2, B1, and B2, respectively, and $Style_{(1,2)}$ represents a degree of influence of style of A1.

6. The apparatus of claim 4, wherein the degree of influence of content is computed by the following equation:

$$Content_{(A,B)}=Max(Conf_{B1}-Conf_{A1}, 0)+Max(Conf_{B2}-Conf_{A2}, 0),$$

where A1 represents an undetected object, B2 represents advance data, A2 represents a first augmented image in which a style attribute of A1 is transferred to correspond to B2, B1 represents a second augmented image in which a content attribute of A1 is transferred to correspond to B2, $Conf_{A1}$, $Conf_{A2}$, $Conf_{B1}$, and $Conf_{B2}$ represent an object detection reliability of A1, A2, B1, and B2, respectively, and $Content_{(A,B)}$ represents a degree of influence of content of A1.

7. The apparatus of claim 4, further comprising a training data generator configured to generate one or more retraining images from the undetected image based on the degree of influence of style and the degree of influence of content.

8. The apparatus of claim 7, wherein the training data generator is configured to change rates of change of style attribute and content attribute according to the degree of influence of style and the degree of influence of content when augmenting the retraining image.

9. The apparatus of claim 4, further comprising a loss function updater configured to update a loss function of the object detector based on the degree of influence of style and the degree of influence of content.

10. The apparatus of claim 9, wherein the loss function updater is configured to change a weight of a classification loss of the loss function according to the degree of influence of style and the degree of influence of content.

11. A method of retraining an object detector, which is performed by a computing device that includes one or more processors and memory storing one or more programs to be executed by the one or more processors, the method comprising:

receiving an undetected image;
generating one or more first augmented images that have a same content attribute as an object area of the undetected image, but a different style attribute;
generating one or more second augmented images that have a same style attribute as the object area, but a different content attribute; and
analyzing a cause of non-detection of the undetected image by comparing object detection reliabilities of the undetected image, the first augmented image, and the second augmented image.

12. The method of claim 11, wherein the generating of the first augmented images comprises extracting the content attribute from the object area and generating the first augmented images by combining the extracted content attribute and a preset style-set.

13. The method of claim 11, wherein the generating of the second augmented images comprises extracting the style attribute from the object area and generating the second augmented images by combining the extracted content attribute and a preset content-set.

14. The method of claim 11, wherein the analyzing comprises calculating a degree of influence of style and a degree of influence of content on the non-detection by using the object detection reliability of each of the undetected image, the first augmented images, and the second augmented images, and preset advance data.

15. The method of claim 14, wherein the degree of influence of style is computed by the following equation:

$$Style_{(1,2)}=Max(Conf_{A2}-Conf_{A1}, 0)+Max(Conf_{B2}-Conf_{B1}, 0),$$

where A1 represents an undetected object, B2 represents advance data, A2 represents a first augmented image in which a style attribute of A1 is transferred to correspond to B2, B1 represents a second augmented image in which a content attribute of A1 is transferred to correspond to B2, $Conf_{A1}$, $Conf_{A2}$, $Conf_{B1}$, and $Conf_{B2}$ represent an object detection reliability of A1, A2, B1, and B2, respectively, and $Style_{(1,2)}$ represents a degree of influence of style of A1.

16. The method of claim 14, wherein the degree of influence of content is computed by the following equation:

$$Content_{(A,B)}=Max(Conf_{B1}-Conf_{A1}, 0)+Max(Conf_{B2}-Conf_{A2}, 0),$$

where A1 represents an undetected object, B2 represents advance data, A2 represents a first augmented image in which a style attribute of A1 is transferred to correspond to B2, B1 represents a second augmented image in which a content attribute of A1 is transferred to correspond to B2, $Conf_{A1}$, $Conf_{A2}$, $Conf_{B1}$, and $Conf_{B2}$ represent an object detection reliability of A1, A2, B1, and B2, respectively, and $Content_{(A,B)}$ represents a degree of influence of content of A1.

17. The method of claim 14, further comprising generating one or more retraining images from the undetected image based on the degree of influence of style and the degree of influence of content.

18. The method of claim 17, wherein the generating of the retraining image comprises changing rates of change of style attribute and content attribute according to the degree of influence of style and the degree of influence of content when augmenting the retraining image.

19. The method of claim 14, further comprising updating a loss function of the object detector based on the degree of influence of style and the degree of influence of content.

20. The method of claim 19, wherein the updating of the loss function comprises changing a weight of a classification loss of the loss function according to the degree of influence of style and the degree of influence of content.

* * * * *